(12) United States Patent
Eftestol et al.

(10) Patent No.: US 8,784,328 B2
(45) Date of Patent: Jul. 22, 2014

(54) METHOD OF ANALYSIS OF CARDIAC IMAGES

(75) Inventors: Trygve Eftestol, Sadnes (NO); Leik Woie, Stavanger (NO)

(73) Assignee: Universitetet I Stavanger, Stavanger (NO)

( * ) Notice: Subject to any disclaimer, the term of this patent is extended or adjusted under 35 U.S.C. 154(b) by 16 days.

(21) Appl. No.: 13/262,613

(22) PCT Filed: Apr. 1, 2010

(86) PCT No.: PCT/GB2010/000661
§ 371 (c)(1),
(2), (4) Date: Nov. 7, 2011

(87) PCT Pub. No.: WO2010/112870
PCT Pub. Date: Oct. 7, 2010

(65) Prior Publication Data
US 2012/0197143 A1   Aug. 2, 2012

(30) Foreign Application Priority Data
Apr. 3, 2009  (GB) .................................. 0905904.9

(51) Int. Cl.
*A61B 5/04* (2006.01)
(52) U.S. Cl.
USPC ........................................................ 600/508
(58) Field of Classification Search
USPC ........................................................ 600/508
See application file for complete search history.

(56) References Cited

U.S. PATENT DOCUMENTS

2009/0099563 A1   4/2009   Ciaccio

OTHER PUBLICATIONS

Schmidt Andre et al; "Infarct tissue heterogeneity by magnetic resonance imaging identifies enhanced cardiac arrhythmia susceptibility in patients with left ventricular dysfunction", Circulation, Journal of the American Heart Association, LNKD-PUBMED: 17389270, vol. 115, No. 15, Apr. 17, 2007, pp. 2006-2014.
Yokota Hajime et al; "Quantitative characterization of myocardial infarction by cardiovascular magnetic resonance predicts future cardiovascular events in patients with ischemic cardiomyopathy", Journal of Cardiovascular Magnetic Resonance, Biomed Central Ltd., London UK, vol. 10, No. 1, Apr. 9, 2008, pp. 1-7.
Yan Andrew T et al; "Characterization of the peri-infarct zone by contrast-enhanced cardiac magnetic resonance imaging is a powerful predictor of post-myocardial infarction mortality", Circulation, Journal of the American Heart Association, LNKD-PUBMED, vol. 114, No. 1, Jul. 4, 2006, pp. 32-39.
Haralick R M; "Statistical and Structural Approaches to Texture", Proceedings of the IEEE, IEEE. New York, US, vol. 67, No. 5, May 1, 1979, pp. 786-804.

(Continued)

*Primary Examiner* — Eric D. Bertram
(74) *Attorney, Agent, or Firm* — IpHorgan Ltd.

(57) ABSTRACT

The invention relates to a method of image analysis of a cardiac image of a human subject who has experienced a myocardial infarction. The method includes delineating an area of said image corresponding to scar tissue within myocardium, from the voxel data for said area, determining at least one value indicative of the likelihood of future cardiac arrhythmia, and optionally applying to said value a prediction matrix generated from the same value for other human subjects who have had a myocardial infarction and who have subsequently experienced cardiac arryhthmia.

13 Claims, 4 Drawing Sheets

(56) References Cited

OTHER PUBLICATIONS

Haralick R M et al; "Computer and Robot Vision I", Computer and Robot Vision, XX, XX, Jan. 1, 1992, pp. 457-464.

Robert M Haralick et al; "Textural Features for Image Classification", IEEE Transactions on Systems, Man and Cybernetics, IEEE Inc. New York, US LNKD-DOI, 10.1109/TSMC. 1973. 4309314, vol. 3, No. 6, Nov. 1, 1973, pp. 610-621.

METHOD OF ANALYSIS OF CARDIAC IMAGES

This invention relates to a method of analysis of cardiac images, in particular magnetic resonance (MR) images, to a computer program for cardiac image analysis and to a computer programmed therewith.

Patients who have suffered but survived one heart attack (myocardial infarction) may subsequently suffer a possibly disabling or fatal cardiac arrhythmia. In many cases therefore, as a precaution, the survivor of a heart attack will be fitted with an intracardiac defibrillator (ICD).

The cost of ICD implantation and follow up is high. The surgery involved is extensive and has as a risk factor the so-called ejection fraction (LVEF). Moreover, the guidelines for ICD implantation are controversial. Accordingly there is a need for an improved method of risk stratification besides reliance on the LVEF, in particular a method of predicting the likelihood of occurrence of cardiac arrhythmia in the short term as, if such can be done, then ICD implantation can be deferred.

It is known that magnetic resonance images of the heart of a patient who has had a myocardial infarction can enable the muscle regions with reduced blood flow, the "scar tissue", to be identified and its location and extent to be mapped and determined. This is particularly facilitated if an MR imaging contrast agent is injected or infused into the patient's cardiovascular system, e.g. a gadolinium or dysprosium chelate or a superparamagnetic particulate.

We have now found that analysis of MR images of cardiac scar tissue may yield a result which can indicate the likelihood of a serious cardiac arrhythmia occurring in the near future and which accordingly may be used as one factor in deciding whether or not an ICD should be implanted promptly.

Viewed from one aspect the invention provides a method of image analysis of a cardiac image, e.g. an MR image, of a human subject who has experienced a myocardial infarction, said method comprising: delineating an area of said image corresponding to scar tissue within myocardium; from the voxel data for said area, determining at least one value indicative of the likelihood of future cardiac arrythmia, e.g. a value indicative of image voxel inhomogeneity or image texture in said area; and optionally applying to said value a prediction matrix generated from the same value for other human subjects who have had a myocardial infarction and who have subsequently experienced cardiac arryhthmia, e.g. determining whether said value as determined is predictive for the occurrence of cardiac arrhythmia in the near future.

The results of image analysis for other patients who have had myocardial infarctions and who over a period of time have or have not (yet) experienced serious, e.g. in the absence of an ICD potentially fatal, cardiac arryhthmias may be used to produce a prediction matrix for application to the value determined from the patient who is the subject of the method. Such a period of time will advantageously be as long as possible, e.g. 6 months to 3 years and the data set should preferably include the delay time between the infarction and the serious arryhthmia. The third party images used to generate the prediction matrix will preferably be ones recorded soon after infarction. Preferably, at least two indicative values, e.g. one indicative of voxel inhomogeneity and a second indicative of image texture, will be determined and will be used to generate the prediction matrix. The prediction matrix may be a scale, it may be graphical or it may be electronic. The prediction result, i.e. the application of the prediction matrix to the determined value(s), may be quantitative, semi-quantitative or qualitatative. By near future in the context of the method of the invention is generally meant up to 50 weeks, more particularly up to 20 weeks, e.g. up to 10 weeks, of the infarction. Thus the physician may be provided with a result suggesting that an ICD be implanted promptly, or that the analysis does not indicate the need to implant an ICD for the time being. If the prediction matrix is supplied to the physician as a linear scale or a two-dimensional chart, as for example in FIG. 1 of the accompanying drawings, the areas of high and low risk of a subsequent serious arryhthmia may conveniently be indicated by colour, by shading or by boundary lines.

The diagnosis by the physician, i.e. the decisions whether or not and when to fit an ICD will of course take other factors, e.g. the health, age and lifestyle of the patient, into account and so the method of the invention is not in itself a method of diagnosis.

Magnetic resonance images, although routinely presented like a two-dimensional digital photograph made up of a two-dimensional array of square picture elements (pixels), are in fact a computer construct from a data set which can be presented as a three-dimensional image made up of a three-dimensional array of cubic volume elements (voxels) or as any two-dimensional slice through the imaged region of the patient. In the method of the invention, two-dimensional images (slices) may be used, but equally the three-dimensional image may alternatively be used. If two-dimensional images are used, it is preferred that the results should be the average for a plurality of parallel slices, preferably 10 to 20. The voxel data in an MR image is generally an intensity value on a white-to-black grey scale corresponding to the radiofrequency signal attributable to a corresponding element in the object or person being imaged. The voxel data however may alternatively be in the form of relaxation times and such data may also be used in the method of the invention.

The delineation of the myocardium and the scar tissue may be performed automatically, e.g. by the computer constructing the MR images, or manually, or automatically following initial operator identification of image zones corresponding to healthy myocardium and scar tissue. The boundary of the scar tissue may be identified for example as the edge of the healthy myocardium at which pixel intensity and/or homogeneity passes outside the normal range for the healthy myocardium. Operator feedback may be desirable to confirm boundary identification.

Besides the boundary between healthy myocardium and scar tissue it is also possible to define as a "grey zone" the outer periphery of the scar tissue where the MR signal difference from healthy myocardium is not as clearly obvious as between the core of the scar tissue and the healthy myocardium.

Values derived from the segmented MR images that might be indicative of a near future event are defined according to the following principles: The values are named as "area.stat.parameter" where "area" describes the location of computation related to the myocardium, "parameter" is the value that is computed from the voxels in the specified location in each segmented image and "stat" defines the statistical value computed from the image specific values.

Exceptions may appear like "area.transf.stat.parameter" meaning that the voxels in the location are transformed as defined by "transf" prior to further calculations.

The locations specified by "area" are defined as follows:
"In"=infarcted tissue
"My"=myocardium not including the infarcted tissue
"Cr"=the core or central part of the damaged tissue "Gs"=the grey zone or the part of the damaged tissue outside the core Parameter codes include the following:

"rd"=parameters of In subtracted from parameters of My
"rr"=parameters of In divided by parameters of My
"gr"=parameters of My divided by parameters of In
"pr"=parameters computed from all segmented voxels The transformations performed on voxels in the location of an image specified by "parameters" are defined as follows:

"Co#"=grey level cooccurrence which represents the probability (or counts) of occurrence of a pair of grey levels separated by a given distance at a specific angle (0, 1, 2, 3 corresponds to angles 0, 45, 90, 135 degrees respectively). The image is first scanned, and a matrix of all probabilities (or counts) of grey level pair occurrences is calculated. From these matrix values the parameters (texture measures according to Haralick R M, Statistical and structural approaches to texture, Proceedings of the IEEE, 67(5);786-804,1979, Haralick, R. M., and L. G. Shapiro. Computer and Robot Vision: Vol. 1, Addison-Wesley, 1992, p. 459. and Haralick R M, Shanmugan K, and Dinstein I. Textural features for image classification, IEEE Transactions on Systems, Man and Cybernetics, SMC-3(6):610-622,1973) and statistics are then calculated as defined above.

The statistical computation to the image specific values specified by "stat" are defined as follows:

"mn" =mean value
"md" =median value
"sd" =standard deviation

The compuations performed on voxels or transformed voxels in the location of an image specified by "parameters" are defined as follows:

"mn"=mean value of voxel values
"md"=median value of voxel values
"sd"=standard deviation of voxel values
"mi"=minimum value of voxel values
"mx"=maximum value of voxel values
"an"=number of voxel values
"cn"=texture measure of contrast derived from cooccurrence matrix
"eg" (or "en")=texture measure of energy derived from cooccurrence matrix
"ho" =measure of homogeneity derived from cooccurrence matrix
"cr'"=texture measure of correlation derived from cooccurrence matrix
"en'"=texture measure of entropy derived from cooccurrence matrix A range of different values indicative of a near future arrhythmia may thus be used in the method of the invention. These include parameters as explained and defined above. FIG. 3 of the accompanying drawings gives an overview of the performance of certain different values, individually or in combination. The performance for each combination is indicated by the area under the ROC curve (left bar), the sensitivity (middle bar) and the specificity (right bar). For each performance measure, the height of the bar gives the mean value with whiskers indicating the 95% confidence interval. These statistics are computed using a leave one out resampling technique.

The predictive efficiency of these statistical values individually, i.e. the ability to distinguish near future arrythmias from longer term future arrhythmias or no future arrhythmias presented in FIG. 3a where the sensitivities, specificities and AUC values are given.

Where two of these statistical values are combined as may be done in the method of the invention, the predictive efficacy is as shown in FIGS. 3b and 4b.

Where three of these statistical values are combined as may be done in the method of the invention, the predictive efficacy is as shown in FIGS. 3c and 4c. Thus, by way of example, the three values combined in the first entries in FIGS. 3c and 4c are (a) rr.Co0.md.cr, My.md.md, and My.Co2.sd.cr and (b) My.Co2.sd.cr, rd.Co2.md.eg and My.Co2.md.ho, respectively.

If desired the method of the invention may make use of higher dimensional combinations of these statistical values: however this may be unnecessary and may make visual presentation of the result more problematic.

Viewed from a further aspect the invention provides a computer program for analysis of cardiac images according to the method of the invention.

Viewed from another aspect the invention provides a data carrier having recorded thereon a computer program for analysis of cardiac images according to the method of the invention.

Viewed from another aspect the invention provides a computer programmed with a computer program according to the invention.

Viewed from a yet further aspect the invention provides a diagnostic imaging device, e.g. an MR imager, incorporating a computer according to the invention.

Viewed from another aspect the invention provides a data carrier having recorded thereon a prediction matrix as defined herein.

By data carrier is meant for example a disc, stick, computer memory or other memory device, or a carrier wave. Such data carriers are well known and need no further description.

The computer program, computer and diagnostic imaging device may use standard components. The program merely needs to take the voxel data values for the defined regions and determine the indicative values and their interrelation using routine subroutines.

The prediction matrix may be built up from a comparison of the selected statistical values derived from images of patients who have had an infarct and their subsequent time lags before a later adverse cardiac event and may be applied to the same values for a newly presenting patient to give a quantitative, semi-quantitative or qualitative indication of the imminent risk of an adverse cardiac event (e.g. a value indicative of high, medium or low risk) so as to assist the physician in her decision as to whether to fit a cardiac implant with little or no delay.

The method described herein is also applicable to other medical imaging modalities besides MR, such as for example ultrasound, PET, X-ray (including CT), etc.

The invention will now be described further with reference to the following non-limiting Example and the accompanying drawings, in which.

Figure 3:
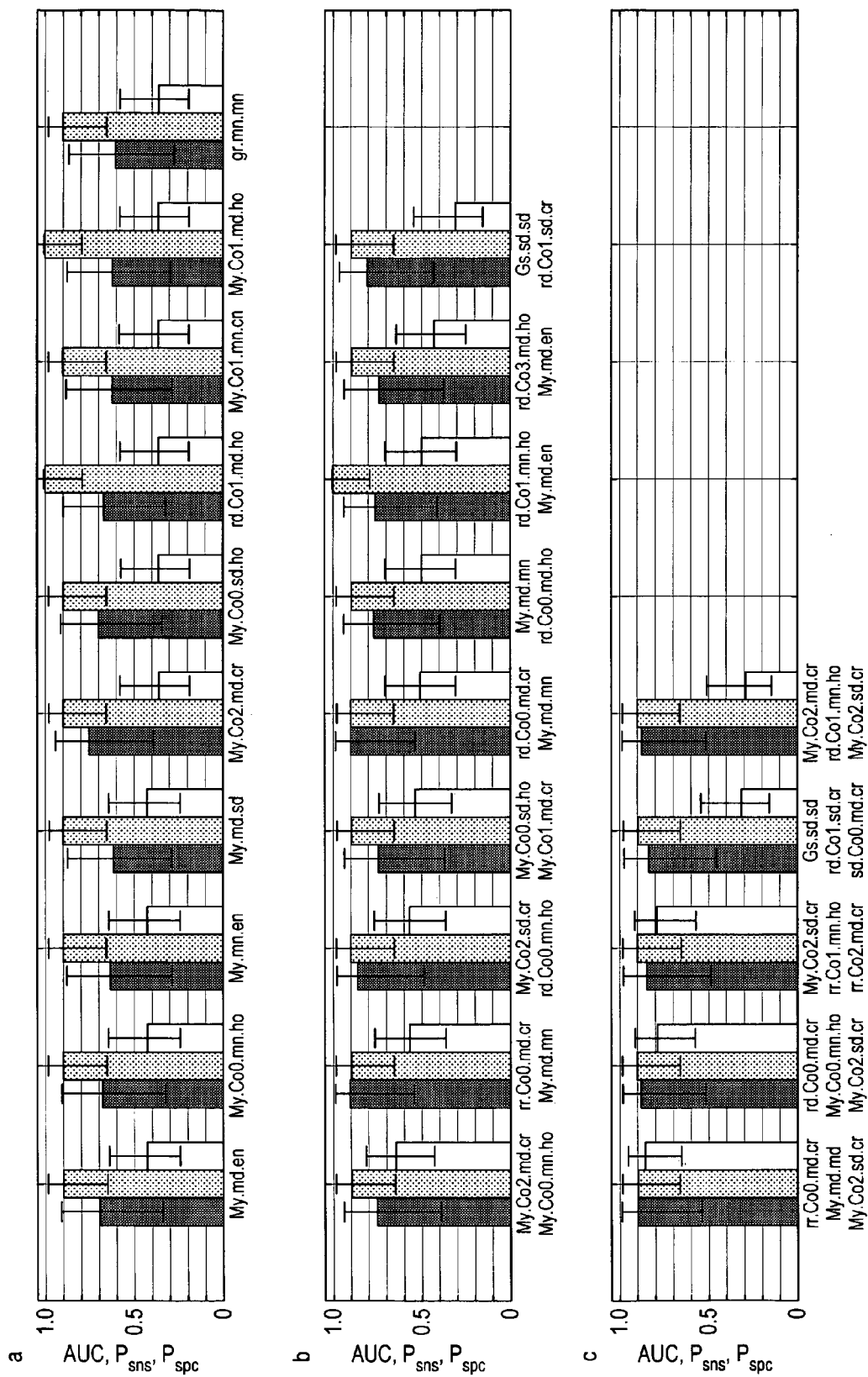
FIG. 3 shows values for predictive efficiency of individual values (FIG. 3a), combinations of two values (FIG. 3b), and combinations of three values (FIG. 3c)
Figure 4:
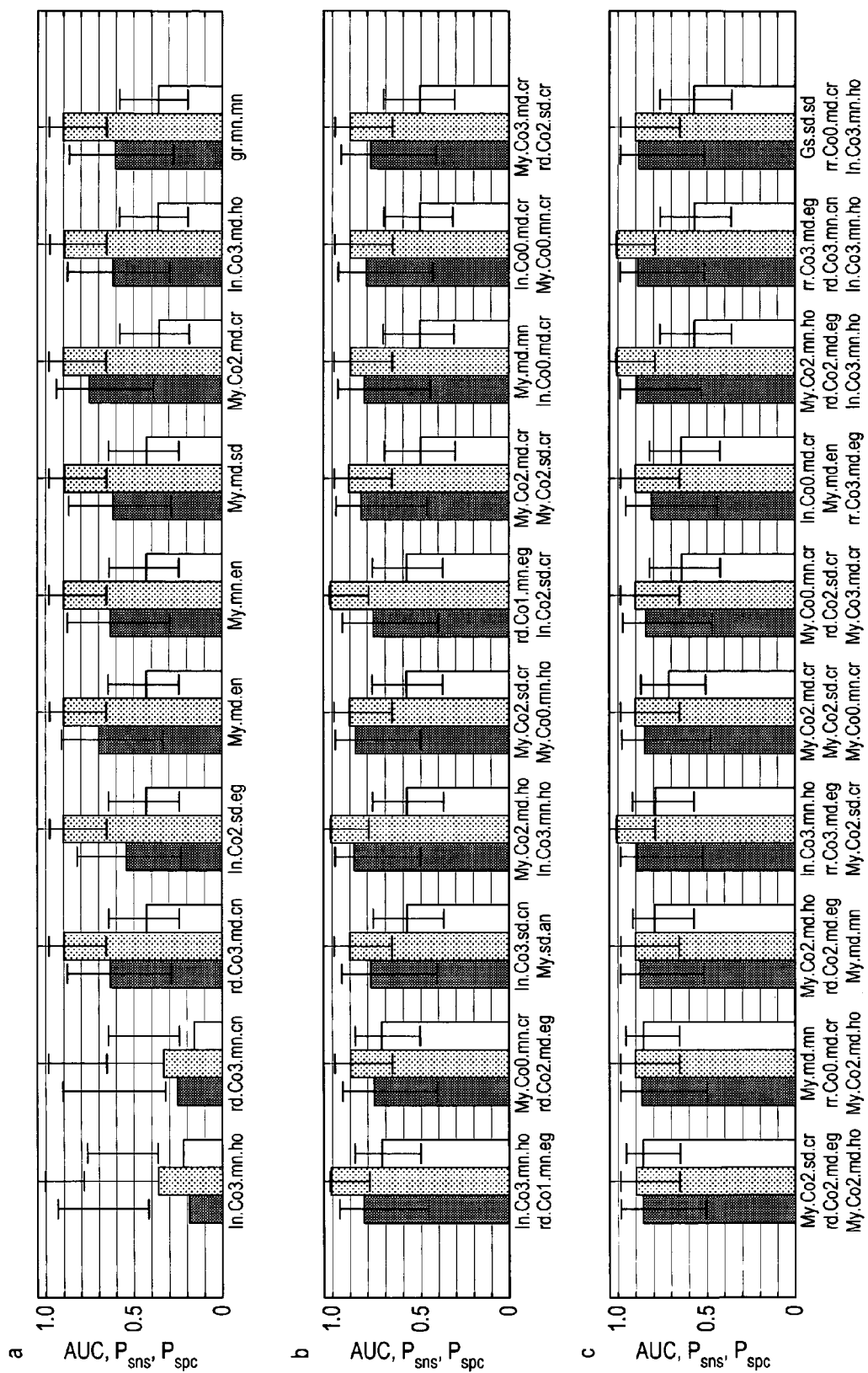
FIG. 4 shows values for predictive efficiency of individual values (FIG. 4a), combinations of two values (FIG. 4b), and combinations of three values (FIG. 4c).

In FIGS. 3 and 4, the vertical axes are for AUC, Psns and Pspc. The entries on the horizontal axes for FIG. 3a, from left to right, are:My.md.en; My.Co0.mn.ho; My.mn.en;

My.md.sd; My.Co2.md.cr; My.Co0.sd.ho; rd.Co1.md.ho; My.Co1.mn.cn; My.Co1.md.ho; and gr.mn.mn. Those for FIG. 3b are:My.Co2.md.cr and My.Co0.mn.ho; rr.Co0.md.cr and My.md.mn; My.Co2.sd.cr and rd.Co0.mn.ho; My.Co0.sd.ho and My.Co1.md.cr; rd.Co0.md.cr and My.md.mn; My.md.mn and rd.Co0.md.ho; rr.Co1.mn.ho and My.md.en; rd.Co3.md.ho and My.md.en; and Gs.sd.sd and rd.Co1.sd.cr. Those for FIG. 3c are:rr.Co0.md.cr, My.md.md and My.Co2.sd.cr; rd.Co0.md.cr, My.Co0.mn.ho and My.Co2.sd.cr; My.Co2.sd.cr, rr.Co1.mn.ho and My.Co2.md.cr; Gs.sd.sd, rd.Co1.sd.cr and rd.Co0.md.cr; and My.Co2.md.cr, rd.Co1.mn.ho and My.Co2.sd.cr. Those for FIG. 4a are: In.Co3.mn.ho; rd.Co3.mn.cn; rd.Co3.md.cn; In.Co2.sd.eg; My.md.en; My.md.en; My.md.sd; My.Co2.md.cr; In.Co3.md.ho; and gr.mn.mn. Those for FIG. 4b are: In.Co3.mn.ho and rd.Co1.mn.eg; My.Co0.mn.cr and rd.Co2.md.eg; In.Co3.sd.cn and My.sd.an; My.Co2.md.ho and In.Co3.mn.ho; My.Co2.sd.cr and My.Co0.mn.cr; rd.Co1.mn.eg and In.Co0.md.cr; My.Co2.md.cr and My.Co2.sd.cr; My.md.mn and In.Co0.md.cr; In.Co0.md.cr and My.Co0.mn.cr; and My.Co3.md.cr and rd.Co2.sd.cr. Those for FIG. 4c are: My.Co2.sd.cr, rd.Co2.md.eg and My.co2.md.ho; My.md.mn, rr.Co0.md.cr and My.Co2.md.ho; My.Co2.md.ho, rd.Co2.md.eg and My.md.mn; In.Co3.mn.ho, rr.Co3.md.eg and My.Co2.sd.cr; My.Co2.md.cr, My.Co2.sd.cr and My.Co0.mn.cr; My.Co0.mn.cr, rd.Co2.sd.cr and My.Co3.md.cr; In.Co0.md.cr, My.md.en and rr.Co3.md.eg; My.Co2.mn.ho, rr.Co2.md.eg and In.Co3.mn.ho; rr.Co3.md.eg, rd.Co3.mn.cn and In.Co3.mn.ho; and Gs.sd.sd, rr.Co0.md.cr and In.Co3.mn.ho.

Figure 1:
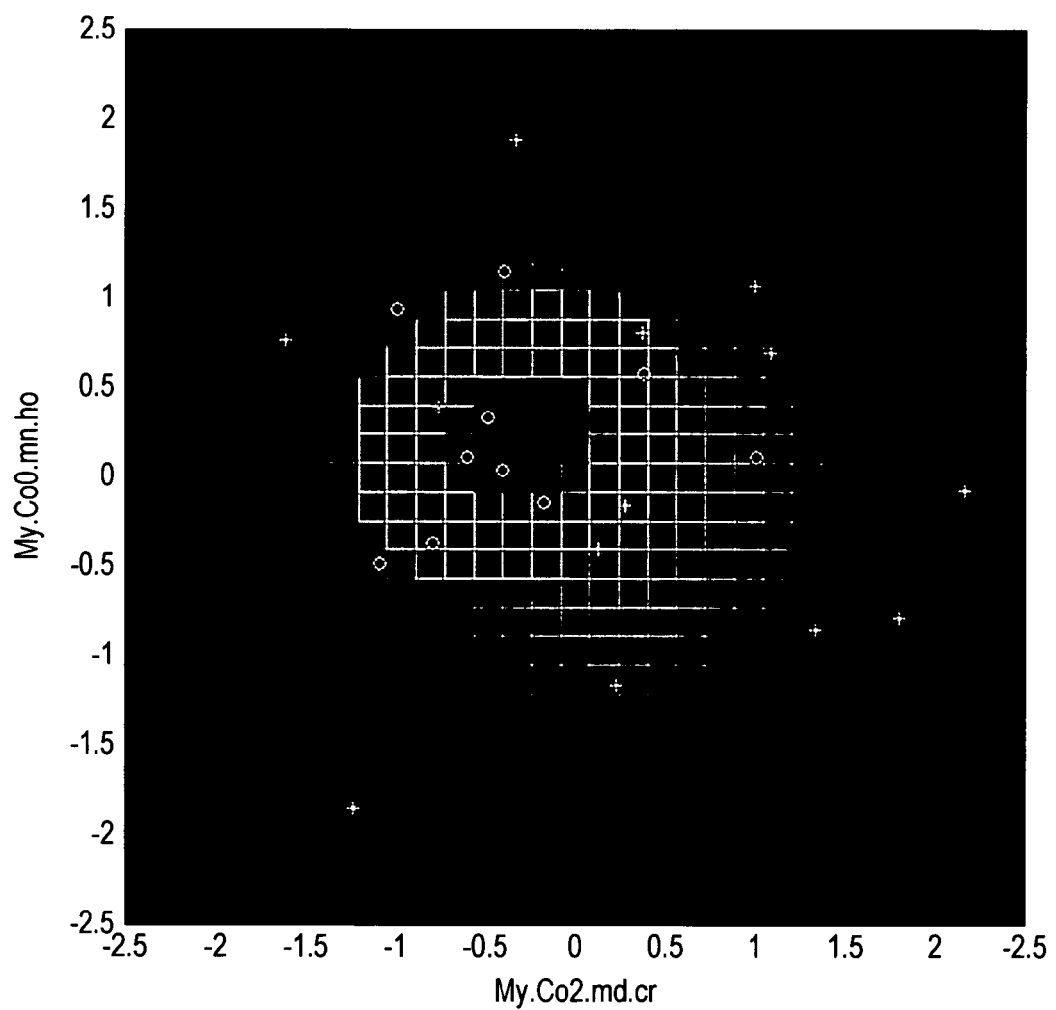
FIG. 1 is a chart showing a prediction matrix for a method according to the invention.
Figure 2:
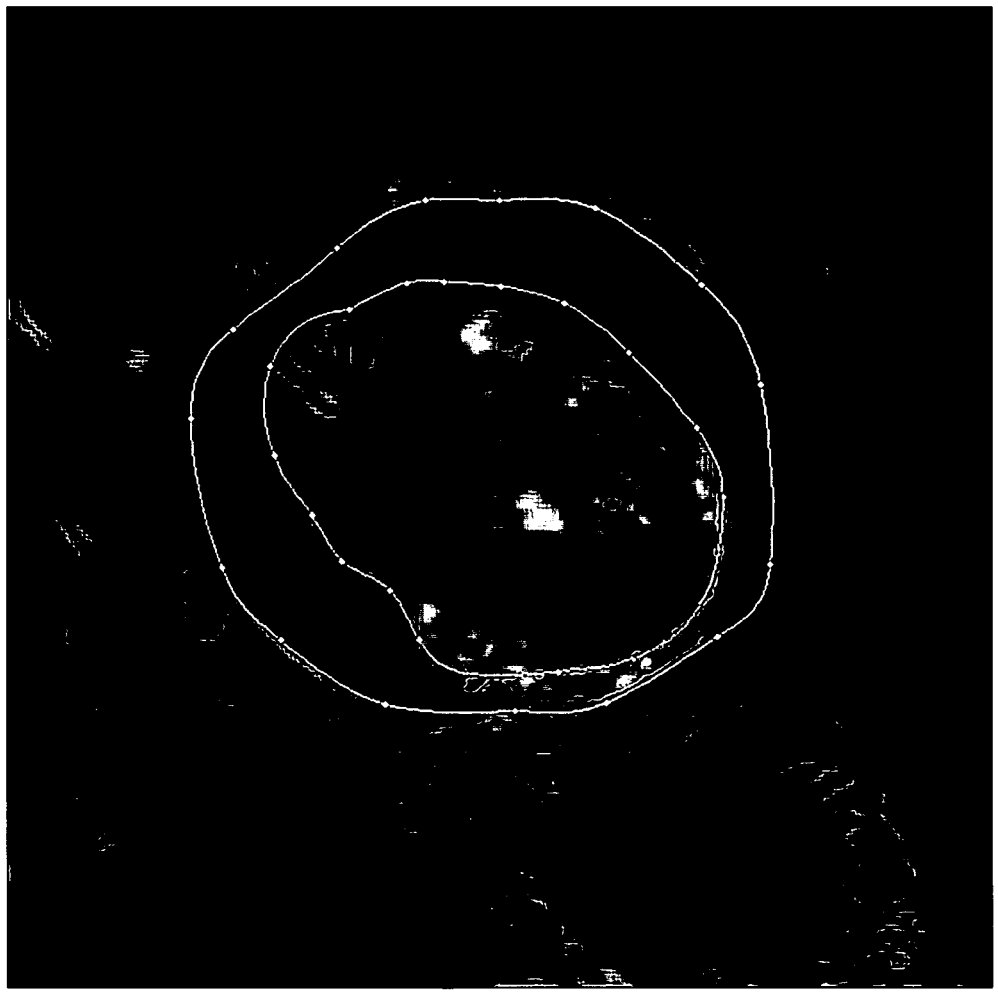
FIG. 2 is an MR image of a human heart showing healthy myocardium and scar tissue delineated.

Referring to FIG. 1 there is shown a prediction matrix in the form of a chart of two values, My.Co0.mn.ho and My.Co2.md.cr. The paler zone in FIG. 1 is the region where the need for urgent ICD implantation is doubtful. Referring to FIG. 2, the myocardium in the image appears as a dark ring, with a zone of scar tissue on the lower right margin.

EXAMPLE 1

Cardiac MR images from 24 patients who had experienced myocardial infarctions were analysed. In all cases ICDs were subsequently implanted. One group (10 patients) had subsequently suffered serious arryhthmias, as recorded by the ICD, within 63 days of ICD implementation while the members of a second group (10 patients) had suffered serious arryhthmias but only after a minimum of 127 days after ICD implantation. In a third group (4 patients), no subsequent serious arryhtmia had been recorded.

In each case, in the MR images a boundary between healthy myocardium and scar tissue was delineated by an operator. For each case about 10 MR images (parallel slices) of the heart were evaluated.

Average values for each of the indicative values listed above were calculated for each patient.

To determine the ability of each indicative value to discriminate between the groups of patients, a leave-one-out technique was used so an indicative value or higher dimensional value combination was trained on 23 cases and tested on one. This was repeated 24 times so as to determine the statistical properties of the results.

The greatest discrimination between patients for whom prompt implantation of an ICD would have been desirable and patients where implantation was not urgent was achieved with the combination of My.Co2.md.cr, rd.Co2.md.eg and My.Co2.md.ho.

The invention claimed is:

1. A method of image analysis of a cardiac image of a human subject who has experienced a myocardial infarction, said method comprising: delineating an area of said image corresponding to scar tissue within myocardium; from the voxel data for said area, determining at least one value indicative of the likelihood of future cardiac arrhythmia, wherein said at least one value is a measure of image texture in said area or a measure of image voxel inhomogeneity in said area; and optionally applying to said value a prediction matrix generated from the same value for other human subjects who have had a myocardial infarction and who have subsequently experienced cardiac arryhthmia.

2. A method as claimed in claim 1 wherein said image is a magnetic resonance image.

3. A method as claimed in claim 2 wherein said prediction matrix is derived from at least two said values.

4. A method as claimed in claim 2 wherein said prediction matrix is derived from at least three said values.

5. A method as claimed in claim 2 wherein said prediction matrix is predictive of the likelihood of cardiac arryhthmia within 10 weeks of myocardial infarction.

6. A method as claimed in claim 1 wherein said prediction matrix is derived from at least two said values.

7. A method as claimed in claim 1 wherein said prediction matrix is derived from at least three said values.

8. A method as claimed in claim 1 wherein said prediction matrix is predictive of the likelihood of cardiac arryhthmia within 10 weeks of myocardial infarction.

9. A computer program for analysis of cardiac images according to the method of claim 1.

10. A non-transitory data carrier having recorded thereon a computer program as claimed in claim 9.

11. A computer programmed with a computer program as claimed in claim 9.

12. A diagnostic imaging device incorporating a computer as claimed in claim 11.

13. A non-transitory data carrier having recorded thereon a prediction matrix as defined in claim 1.

* * * * *

UNITED STATES PATENT AND TRADEMARK OFFICE
CERTIFICATE OF CORRECTION

Page 1 of 1

PATENT NO.         : 8,784,328 B2
APPLICATION NO.    : 13/262613
DATED              : July 22, 2014
INVENTOR(S)        : Trygve Eftestol, Leik Woie and Kjersti Engan It is certified that error appears in the above-identified patent and that said Letters Patent is hereby corrected as shown below:

On the Title Page, Item (75) Inventors:

To add additional inventor --

Kjersti ENGAN, Stavanger (NO)

On the Title Page, Item (73) Assignee:

To add additional assignee --

Stavanger University Hospital, Stavanger (NO)

Signed and Sealed this
Ninth Day of February, 2016

Michelle K. Lee
*Director of the United States Patent and Trademark Office*